United States Patent [19]

Yanaka et al.

[11] Patent Number: 5,946,689
[45] Date of Patent: Aug. 31, 1999

[54] DISTRIBUTED DATABASE SYSTEM AND METHOD OF DETECTING CONTENTION IN DATA UPDATE INVOLVED IN REPLICATION OF DATABASE DATA

[75] Inventors: Hiroyuki Yanaka, Yokohama; Satoshi Wakayama, Sakai; Takeo Maruyama; Hitoshi Tanaka, both of Yokohama; Norifumi Nishikawa, Amagasaki; Hideyuki Takatani, Omiya, all of Japan

[73] Assignee: Hitachi, Ltd., Tokyo, Japan

[21] Appl. No.: 08/979,946

[22] Filed: Nov. 26, 1997

[30] Foreign Application Priority Data

Nov. 28, 1996 [JP] Japan .................................... 8-318047

[51] Int. Cl.$^6$ .................................................. G06F 17/30
[52] U.S. Cl. ......................... 707/10; 707/202; 707/203; 707/204; 707/511
[58] Field of Search ................................ 707/3, 4, 10, 8, 707/104, 200, 201, 202, 203, 204, 511

[56] References Cited

U.S. PATENT DOCUMENTS

| | | | |
|---|---|---|---|
| 5,117,351 | 5/1992 | Miller | 707/10 |
| 5,440,727 | 8/1995 | Bhide et al. | 711/117 |
| 5,499,367 | 3/1996 | Bamford et al. | 707/8 |
| 5,586,310 | 12/1996 | Sharman | 707/10 |
| 5,603,024 | 2/1997 | Goldring | 707/203 |
| 5,729,736 | 3/1998 | Gomi et al. | 707/10 |
| 5,740,348 | 4/1998 | Cunliffe et al. | 707/10 |
| 5,878,434 | 3/1999 | Draper et al. | 707/202 |
| 5,884,325 | 3/1999 | Bauer et al. | 707/201 |

*Primary Examiner*—Wayne Amsbury
*Assistant Examiner*—Srirama Channavajjala
*Attorney, Agent, or Firm*—Antonelli, Terry, Stout & Kraus, LLP

[57] ABSTRACT

In a distributed database system including a plurality of database systems each having a database, wherein a database possessed by one of the database systems serves as an original database, and databases of the remaining database systems are produced by replicating the original database, the presence or absence of update contention of the same data in two database systems is detected. When data susceptible to detection of update contention is updated, an update serial number is produced for the data. The update serial number includes a system identifier for identifying a database system in which the data is updated and an update frequency related to the number of times of updates. The update serial number is accumulatively stored in an update serial number history associated with the data each time the data is updated. When the updated data and the update serial number history associated therewith are transferred to a receiving database system, the contents of the update serial number history associated with the received data is compared with the contents of an update serial number history associated with data corresponding to the received data (target data) in a database of the receiving database system, and a contending state of the received data with the target data is determined based on the result of the comparison in the receiving database system.

18 Claims, 13 Drawing Sheets

FIG. IIB
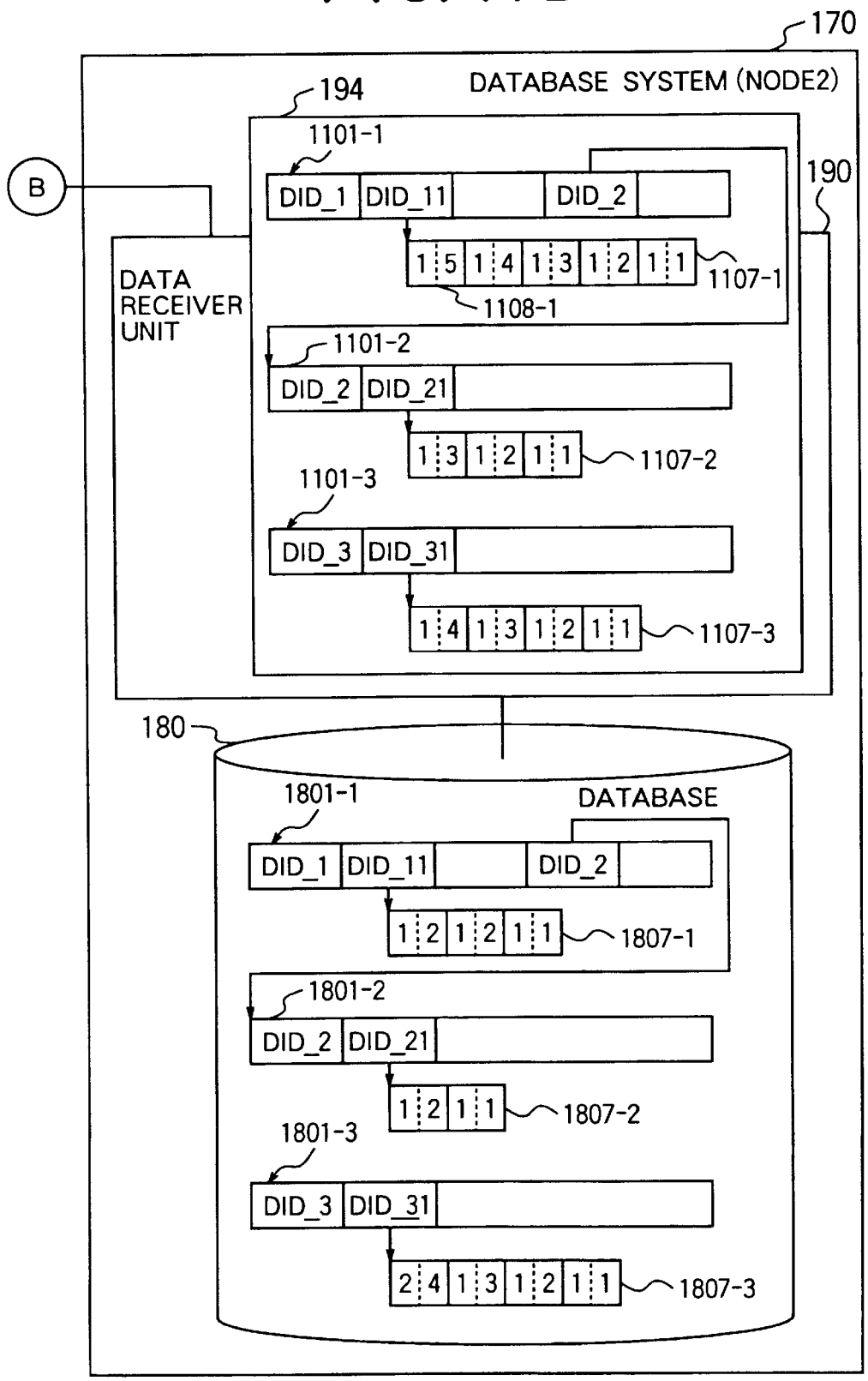

DISTRIBUTED DATABASE SYSTEM AND METHOD OF DETECTING CONTENTION IN DATA UPDATE INVOLVED IN REPLICATION OF DATABASE DATA

BACKGROUND OF THE INVENTION

The present invention relates to a distributed data base system which controls a plurality of database systems to reflect update of data in one database to other databases using a replica of the updated data such that the contents of the databases in the plurality of database systems are coincident with each other, and more particularly to a method of detecting the presence or absence of contention, which may occur when data is updated, to enable respective databases to update data independently of each other.

As a form of a distributed database system, there is known a so-called replication, i.e., a distributed data updating technique which provides a replica of an original database in a database system to other database systems so as to permit the respective database systems to asynchronously update their databases. The replication is a technique for reflecting update or deletion performed in a primary database, which is an original database on a network, to secondary databases. When certain data is updated in the primary database, an update contention may occur if data corresponding to the certain data is also updated or deleted in a secondary database.

A method of determining whether or not an update contention occurs is disclosed, for example, in "Lotus NOTES RELEASE 3.1J System Manager's Guide" (published by Lotus Co.,), pp. 10–17. In this document, each data is provided therein with a field for storing an update counter, such that the value of the update counter is incremented when the data is updated. When data is replicated, an update contention is determined from a comparison of values of associated update counters in the data contained in the primary and secondary databases.

Also, an article entitled "Distributed RDB Updating Techniques—Replication Function Effective in Trigger/Stored Procedure", Network Computing, February 1994, pp. 16–21, discloses that update information of transactions performed in an original database system is transferred to a destination database system when replication is performed to permit the destination database to update its own database based on the update information.

The former prior art technique has a problem involved in its determination of an update contention based on a comparison of the values of the update counters provided in respective data. Specifically, when data is replicated independently among a plurality of systems, a contention of data cannot be detected if the number of times of updates is different in these systems. Also, while the latter prior art technique discloses the transfer of update information in units of transactions from an original database system, it does not describe any specific method of determining an update contention. In addition, the latter prior art technique implies problems in that data in a database in the destination database system does not have the latest contents until the reflection of the update information is completed in the destination database, and that it takes a long time to complete the reflection of the update information.

SUMMARY OF THE INVENTION

It is an object of the present invention to provide a method of correctly detecting an update contention in each of database systems in a distributed database system which forces the respective database systems to match the contents of their databases.

The present invention produces an update serial number, for each data, which defines an update unit of a database, including an identifier for identifying a database system which has updated (or produced) its data, and the number of times of updates performed on the data. Then, the update serial number is added to an update serial number history which accumulates the update serial number each time the data is updated. When the updated data is reflected to a database in a destination database system, the updated data and the update serial number history associated therewith are transferred from the original database system to the destination database system. Characteristically, in the destination database system, an update serial number in the update serial number history associated with the received updated data is compared with an update serial number in an update serial number history associated with data to be updated or reflected in the destination database system to determine an update contention.

According to the present invention, since data has an identifier for identifying a database system in which the data has been updated (or produced) as an update serial number, an update contention can be correctly detected even with a plurality of database systems which receive replicated data. In addition, since an update is reflected in units of data to be updated instead of transferring update information in units of transaction, a reduction in time can be achieved in reflecting updated data to a secondary database.

BRIEF DESCRIPTION OF THE DRAWINGS

FIGS. 11A and 11B are schematic diagrams respectively illustrating a primary database system and a secondary database system for explaining specific operations for determining an update contention in the embodiment of the present invention;

DESCRIPTION OF THE PREFERRED EMBODIMENTS

The present invention will hereinafter be described in connection with its embodiments with reference to the accompanying drawings.

Figure 1:
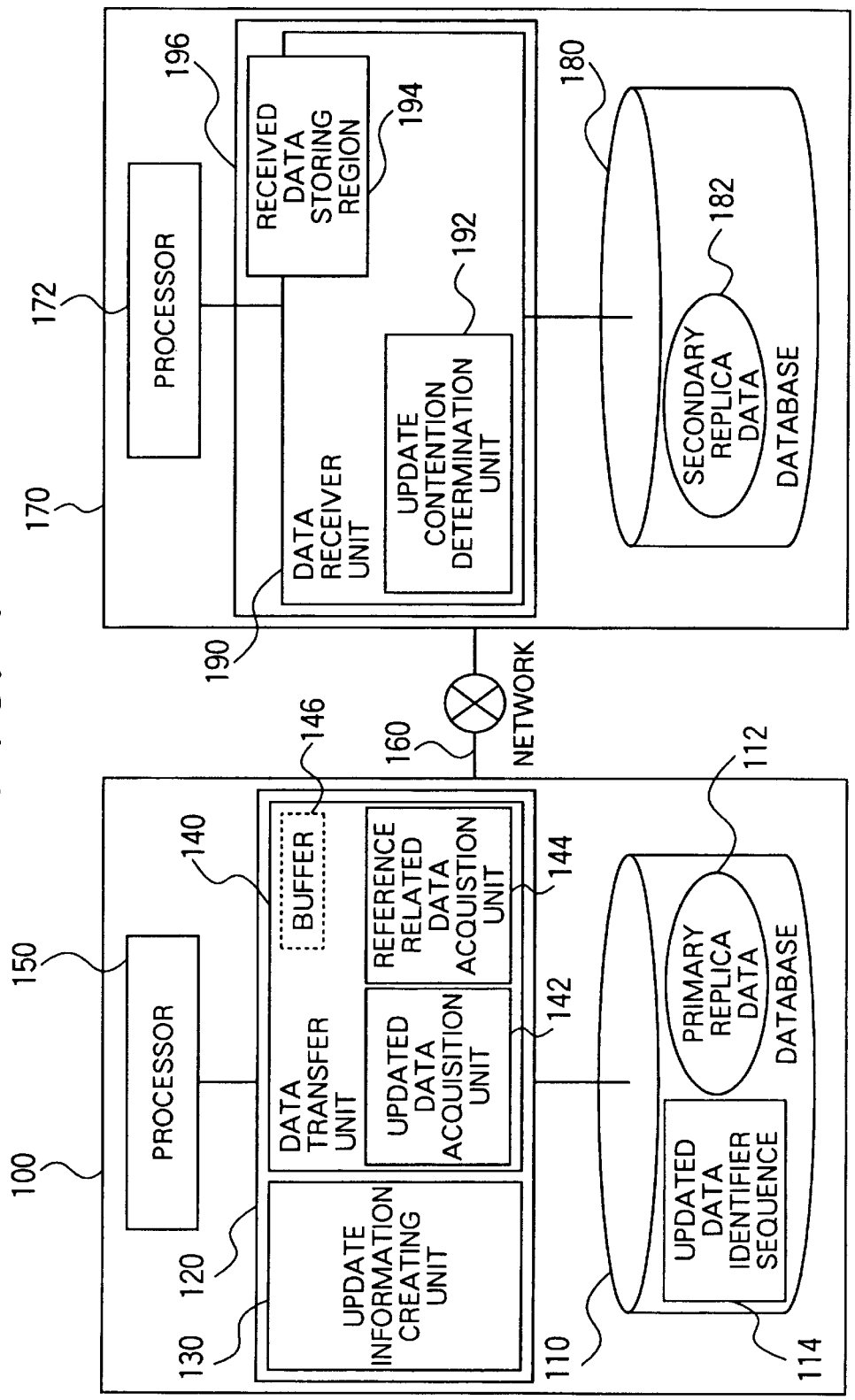
FIG. 1 is a block diagram illustrating the configuration of a computer system according to an embodiment of the present invention.

FIG. 1 illustrates the configuration of a distributed computer system (distributed database system) according to one embodiment of the present invention. A database system 100 on a primary replica side, which operates on a first computer, comprises primary replica data 112 which serves as the original for making replica and has an update serial number history associated with each data; an updated data identifier sequence 114 for holding data identifiers of updated data; and a database 110 provided on an external storage unit for storing the primary replica data 112 and the updated data identifier sequence 114. The database system 100 also comprises an update information creating unit 130 for storing a data identifier of updated data in the updated data identifier sequence 114; an updated data acquisition unit 142 for acquiring updated data from the database 110 with reference to the updated data identifier sequence 114; a reference related data acquisition unit 144 for acquiring reference related data which is in reference relation with acquired updated data; and a data transfer unit 140 for transferring acquired updated data and data in reference relation therewith. The data transfer unit 140 includes the updated data acquisition unit 142 and the reference related data acquisition unit 144.

The update information creating unit 130, the updated data acquisition unit 142, the reference related data acquisition unit 144, and the data transfer unit 140 are programs constituting the database system 100 which are executed by a processor 150 stored in a main storage unit 120. It should be noted that in FIG. 1, the illustration of application programs for issuing requests such as reference, update, and so on to the database system 100 and a database system 170 is omitted.

The database system 170 on a secondary replica side, which operates on a second computer, comprises secondary replica data 182 which is a replica of the primary replica data 112 and has an update serial number history associated with each data. A database 180 is provided on an external storage unit 180 for storing the secondary replica data 182. The database system 170 also comprises a data receiver unit 190 for receiving updated data and reference related data transferred from the first computer 100 through a network 160; a received data storing region for temporarily storing data transferred thereto on a main storage as received data; and an update contention determination unit 192 which forms part of the data receiver unit 190 for determining an update contention of received data and the secondary replica data 182 corresponding to the received data. The data receiver unit 190 and the update contention determination unit 192, which are programs constituting the database system 170, are stored on a main storage unit 196 of the second computer and is executed by a processor 172. It should be noted that while the database system 170 also has an update information creating unit 130 and a data transfer unit 140, they are omitted from FIG. 1 for facilitating the understanding of the features of the present invention.

Figure 2:
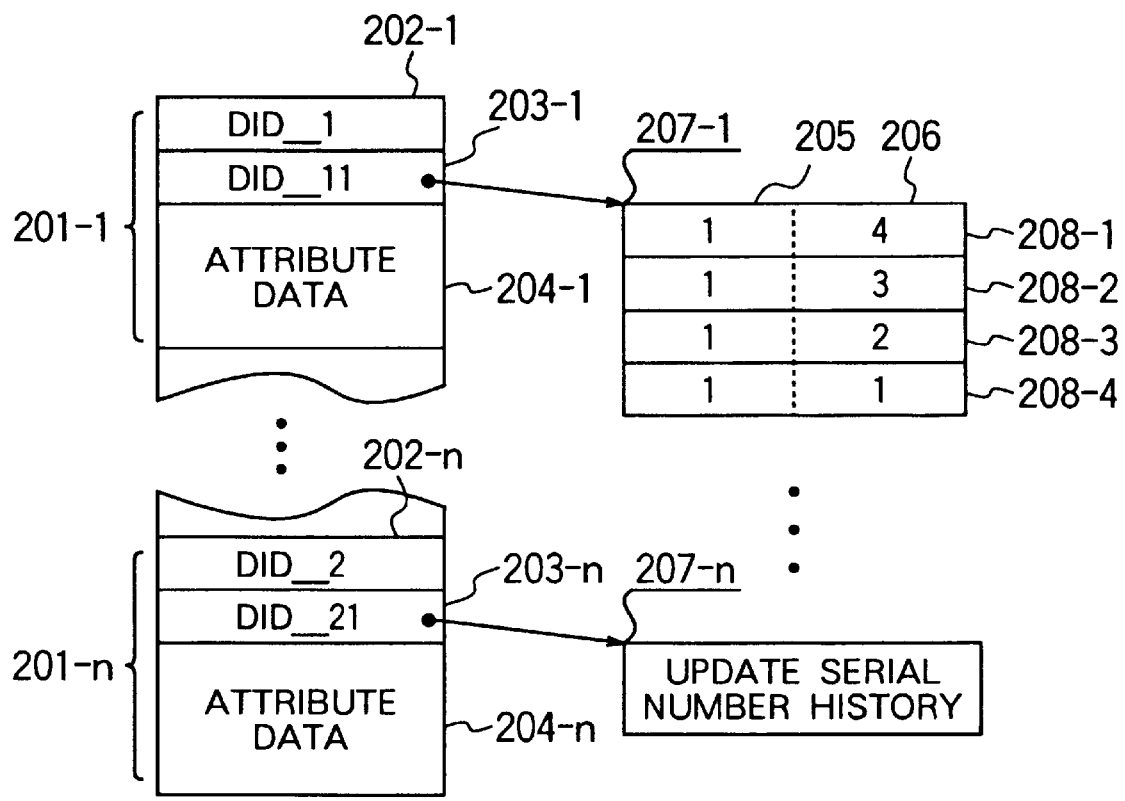
FIG. 2 is a diagram illustrating structures of data and update serial number history in the embodiment of the present invention.

FIG. 2 illustrates the structure of respective data in the primary replica data 112 and the secondary replica data 182. The primary replica data 112 and the secondary replica data 182 are each composed of plural sets of data 201-1, . . . , 201-n, and update serial number histories 207-1, . . . , 207-n associated with the respective data sets. Each data 201-1, . . . , 201-n is composed of a data identifier 202-1, . . . , 202-n for uniquely identifying the data in the database system; history identifiers 203-1, . . . , 203-n each for pointing to a storing position on the database of an associated update serial number history 207-1, . . . , 207-n for holding the history of an associated update serial number; and attribute data 204-1, . . . , 204-n. Here, the data 201-1, . . . , 201-n are data defining a unit for reference and update in the primary replica data 112 and the secondary replica data 182.

Each of the attribute data 204-1, . . . , 204-n is an ordinary data composed of one or more data items other than the data identifier 202-1, . . . , 202-n and the history identifier 203-1, . . . , 203-n. Taking the data 201-1 as an example of typical data, an entry of the update serial number history 207-1 is serial numbers 208-1, . . . , 208-n, each of which is composed of a node number 205 and an update counter 206. The node number 205 is an identifier of a computer which updates (or produces) data in a database system or an identifier of a database system in which data is updated (or produced), while the update counter 206 shows a number indicative of the number of times of data updates. In the example illustrated in FIG. 2, the update serial number history 207-1 holds an update serial number 208-1 of the data 201-1 at the latest (fourth) update; an update serial number 208-2 at the third update; an update serial number 208-3 at the second update; and an update serial number 208-4 at the first update. While the number of the held update serial numbers 208 is chosen to be four to hold update serial numbers up to the fourth generation in the example of FIG. 2, the number of generations to be held therein may be arbitrarily chosen.

For example, in FIG. 2, the data 201-1 includes the contents DID_1 of the identifier 202-1 of updated data; the contents DID_11 of the data identifier 203-1 for the update serial number history 207-1 corresponding to this updated data; and the attribute data 204-1. Also, the corresponding update serial number history 207-1 indicates that associated data was updated for the fourth time in the database system having the node number 1, previously updated for the third time in the database system having the node number 1, and previously updated for the second time in the database system having the node number 1, and had been originally created in the system having the node number 1. In the following, when data 201, data identifier 202, history identifier 203, update serial number history 207, and update serial number 208 are used without suffix, they are assumed to indicate arbitrary ones.

Figure 3:
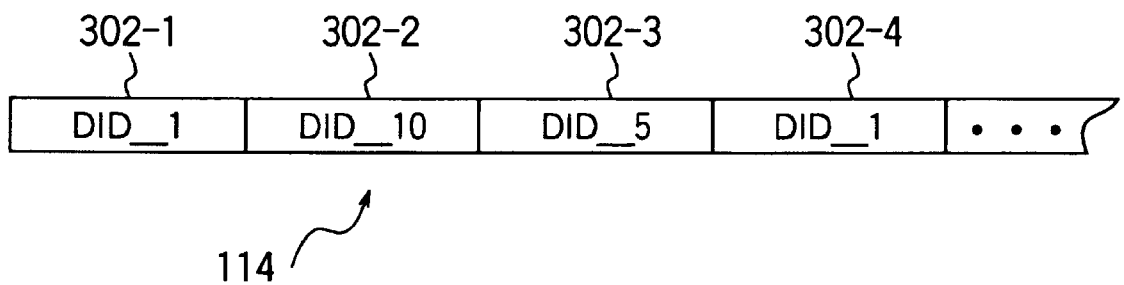
FIG. 3 is a diagram illustrating a data structure of an updated data identifier in the embodiment of the present invention.

FIG. 3 illustrates the data structure of the updated data identifier sequence 114. The updated data identifier sequence 114 holds, as its elements, data identifiers 202 of data updated in the database system 100 in an order in which they have been updated, as 302-4, 302-3, 302-2, 302-1. The same updated data identifies may be stored twice or more in the updated data identifier sequence 114. In the example illustrated in FIG. 3, the updated data identifier sequence 114 indicates that data respectively identified by DID-1, DID_10, DID_5, DID_1, and so on, as the contents of the updated data identifier 302, have been updated in time series manner from left to right in FIG. 3. The contents DID_1 of the data identifier appears twice to indicate that the data having this identifier have been updated twice. In the following, an element 302 without suffix indicates an arbitrary element in the updated data identifier sequence 114.

The database system 100 and the database system 170 each reserve a new entry for storing an update serial number 208 in an update serial number history 207 pointed by the history identifier 203 each time data 201 is produced or updated, stores the identifier of its own database system in a node number 205, and stores the number of times the data 201 has been updated in the update counter 206. The update counter 206 indicates "1" when data 201 is produced, and a serial number equal to the previous value of the update counter 206 incremented by one is stored in the update counter 206 every time the data 201 is subsequently updated.

Some data may contain data in reference relation with the data itself in its attribute data.

Figure 4:
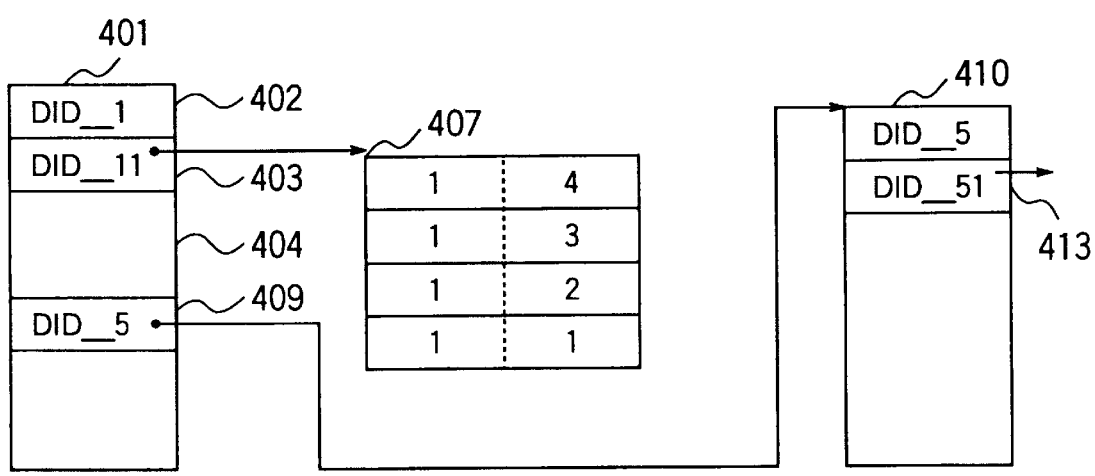
FIG. 4 is a diagram illustrating the structure of data that includes, in its attribute data field, an identifier of data which is in reference relationship with the data.

FIG. 4 illustrates an example of the data structure of such data. In FIG. 4, data 401 has a data identifier 402 and a history identifier 403. An update serial number history 407 associated with the data 401 may be acquired from the history identifier 403. Also, attribute data 409 in the data 401 contains a data identifier 409 of data 410 which is in reference relationship with the data 401. The data 410 in reference relationship may be acquired from the data identifier 409. An update serial number history (not shown) associated with the data 410 may be acquired based on a history identifier 413 of the acquired data 410. In this way, data in reference relationship with the data 401 may be all acquired.

Figure 5:
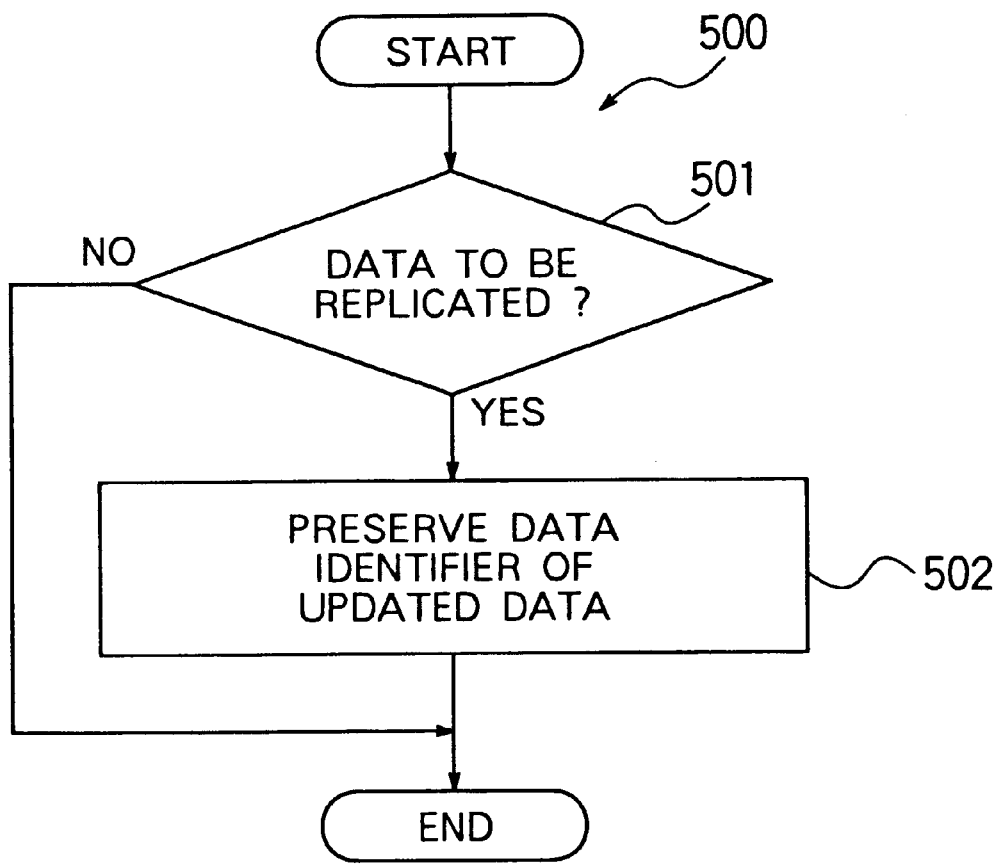
FIG. 5 is a flow chart illustrating a flow of processing executed in an update information creating unit in the embodiment of the present invention.

FIG. 5 is a flow chart illustrating the flow of processing 500 executed in the update information creating unit 130. When data 201 in the primary replica data 112 is updated, the control is transferred to the update information creating unit 130 in the database system 100 to start the processing. At step 501, it is determined whether or not the updated data 201 is to be replicated, and a data identifier 202 associated with this updated data 201 is stored at the latest position in the updated data identifier sequence 114 in the database 110 at step 502, if the data 201 is to be replicated. Data to be replicated refers to data which needs to be replicated, as specified by a user.

Figure 6:
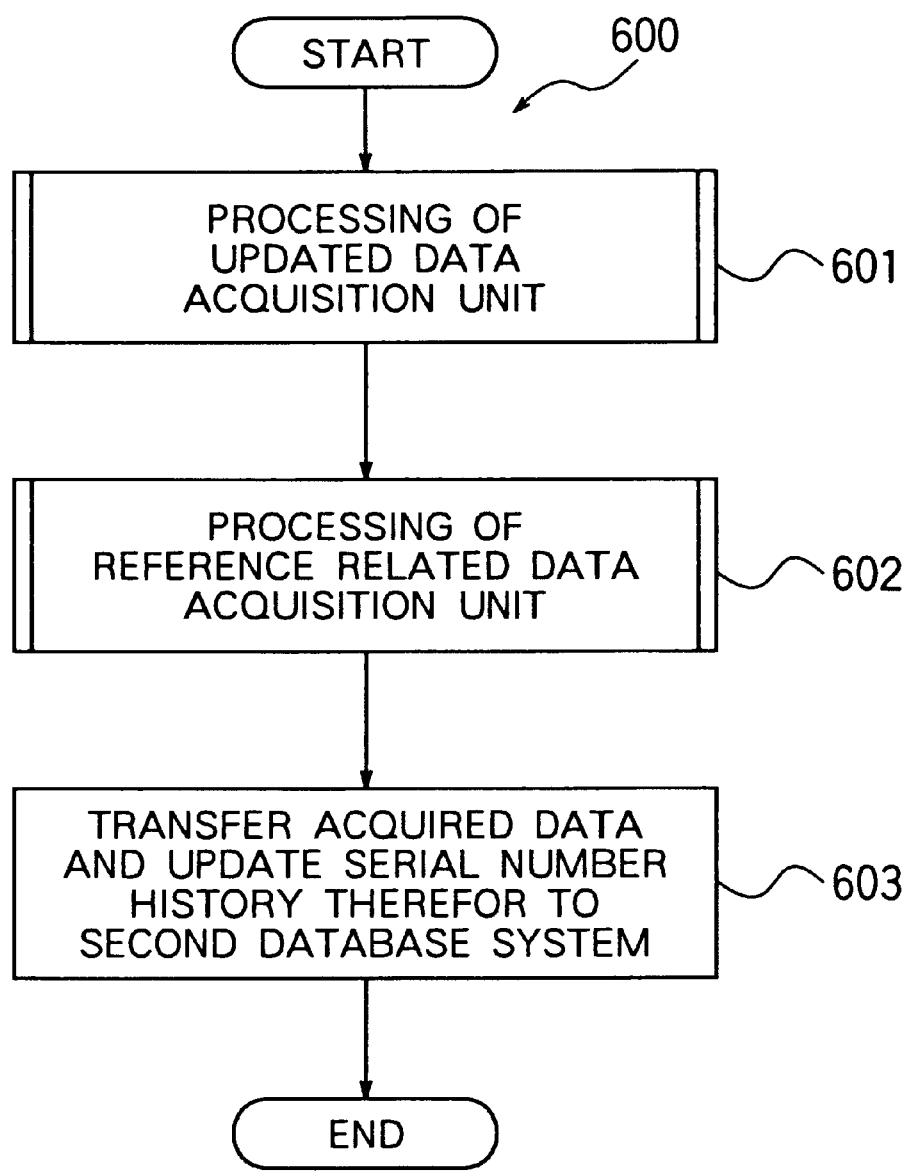
FIG. 6 is a flow chart illustrating a flow of processing executed in a data transfer unit in the embodiment of the present invention.

FIG. 6 is a flow chart illustrating the flow of processing 600 executed in the data transfer unit 140. When an application program requests replication processing for the database system 100, or when a periodically issued request for the replication processing is initiated in the database system 100 at a specified time, the control is transferred to the updated data acquisition unit 142 in the database system 100. Data updated by executing the processing of the updated data acquisition unit 142 is acquired at step 601, and the processing of the reference related data acquisition unit 114 is executed at step 602 to acquire data (for example 410), which is in reference relationship with the updated data (for example 401), and update serial number histories associated with these data. Then, at step 603, these data and the update serial number histories associated with the data acquired by the updated data acquisition unit 142 and the reference related data acquisition unit 114 are transferred to the database system 170 on the second computer through the network 160.

Figure 7:
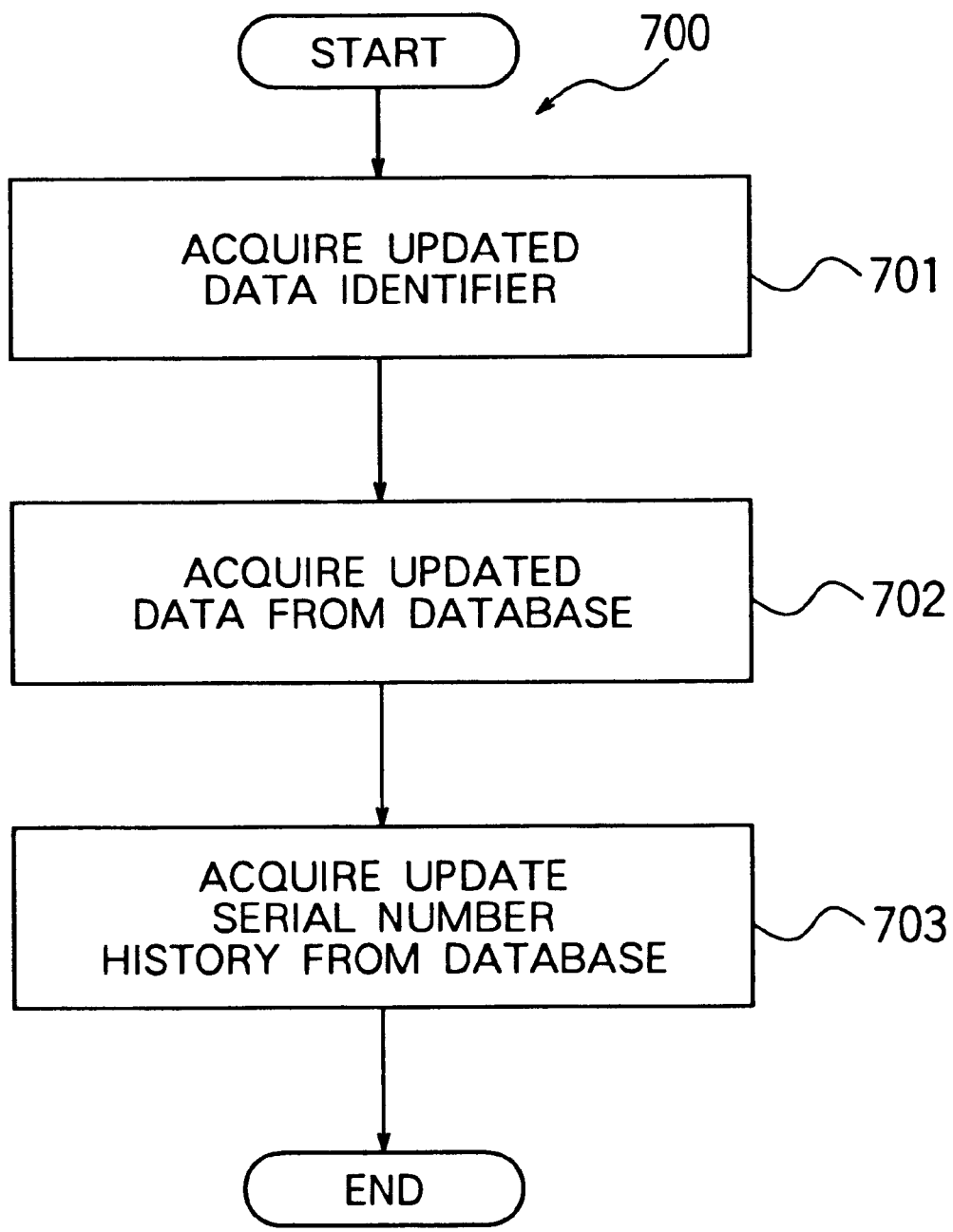
FIG. 7 is a flow chart illustrating a flow of processing executed in an updated data acquisition unit in the embodiment of the present invention.

FIG. 7 is a flow chart illustrating the flow of processing 700 executed in the updated data acquisition unit 142. At step 701, one of updated data identifiers 302 held in the updated data identifier sequence 114 is acquired. In the event that the updated data identifier sequence 114 contains data identifiers of data updated within a predetermined time period, when updated data are transferred at intervals of the predetermined time period according to the present invention, the transfer may be initiated from any one of updated data identifiers in the updated data identifier sequence 114. At step 702, data 201 corresponding to the updated data identifier 302 is acquired from the database 110. Then, at step 703, an update serial number history 207 corresponding to the data 201 is acquired from the data base 110 with reference to the data identifier 203.

Figure 8:
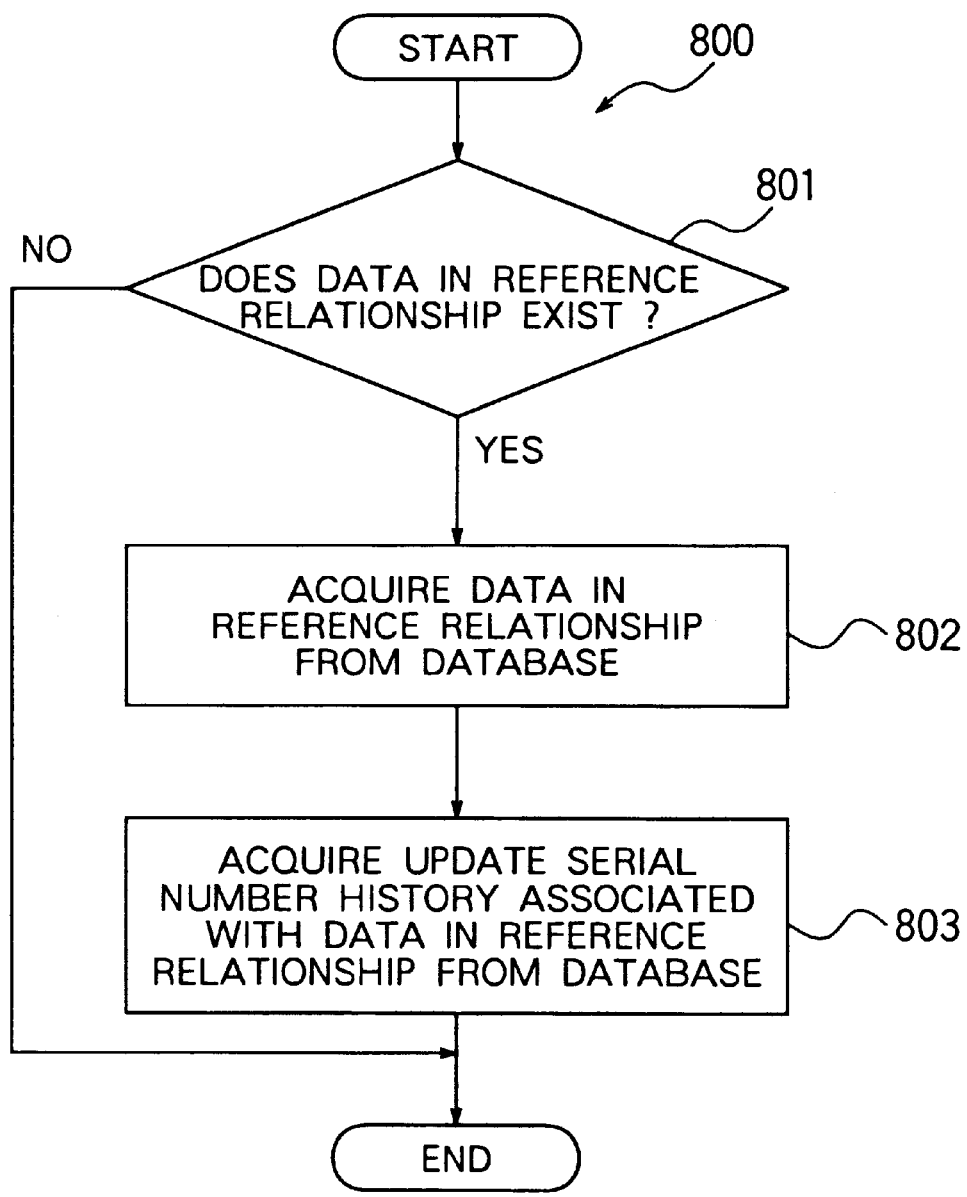
FIG. 8 is a flow chart illustrating a flow of processing executed in a reference related data acquisition unit in the embodiment of the present invention.

FIG. 8 is a flow chart illustrating the flow of processing 800 executed in the reference related data acquisition unit 114. Explaining the processing 800 with further reference to the data structure of FIG. 4, it is checked at step 801 whether or not there is data in reference relationship with updated data acquired by the updated data acquisition unit 142, i.e., whether or not the identifier 409 of the data 410 in reference relationship with the updated data 401 is held in the attribute data 404 of the updated data 401. If held, the data 410 corresponding to this data identifier 409 is acquired from the database 110 at step 802, and an update serial number history 207 corresponding to this reference related data 410 is acquired at step 803. If not held, the processing 800 is terminated.

The data transfer unit 140 repeats the processing of the updated data acquisition unit 142 (step 601), the processing of the reference related data acquisition unit 114 (step 602), and the data transfer (step 603) for each of updated data identifiers 302, if any, remaining in the updated data identifier sequence 114. When the updated data identifier sequence 114 is depleted of data identifiers 302, the data transfer unit 140 terminates the processing and enters a waiting state.

Figure 9:
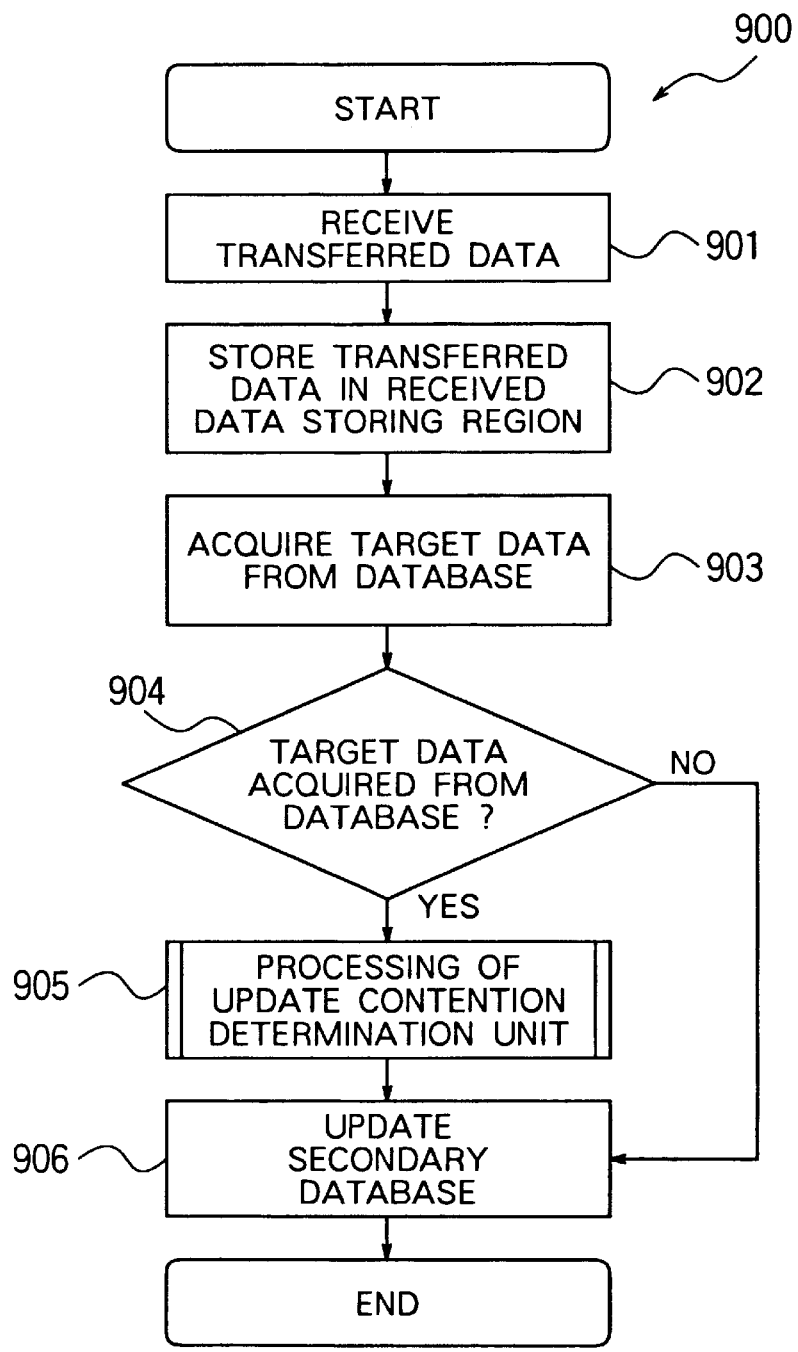
FIG. 9 is a flow chart illustrating a flow of processing executed in a data receiver unit in the embodiment of the present invention.

FIG. 9 is a flow chart illustrating the flow of processing 900 executed in the data receiver unit 190 in the database system 170. Data transferred from the database unit 100 on the first computer is received at step 901, and the received data is held in the received data storing region 194 on the main storage unit 196 at step 902. At step 903, data in the secondary replica data 182 having the same data identifier as the data identifier 202 of the next one unit of received data held in the received data storing region 194 (hereinafter referred to as "target data") and an update serial number history associated with the target data are acquired from the database 180. If data identifier 202 of data 201 in reference relationship exists in attribute data 204 of the received data 201, and if the received data involves data in reference relationship therewith, target data corresponding to the data 201 in reference relationship and an associated update serial number history 207 are also acquired from the database 180. If no target data is found in the secondary replica data 182, and if the update counter 206 of the update serial number 208 in the update serial number history 207 associated with the received data is "1," this means that the received data has just been produced in the database 110 so that the target data cannot be acquired from the database 180 (NO at step 904). In this case, the next step 905 is skipped to execute step 906 where the produced data is added to the secondary database 180. When the target data can be acquired from the database 180, the processing of the update contention determination unit 192 is executed at step 905 to determine an update contention of the received data with the target data. At step 906, the database 180 is updated with the received data based on the determination result at step 905.

Figure 10:
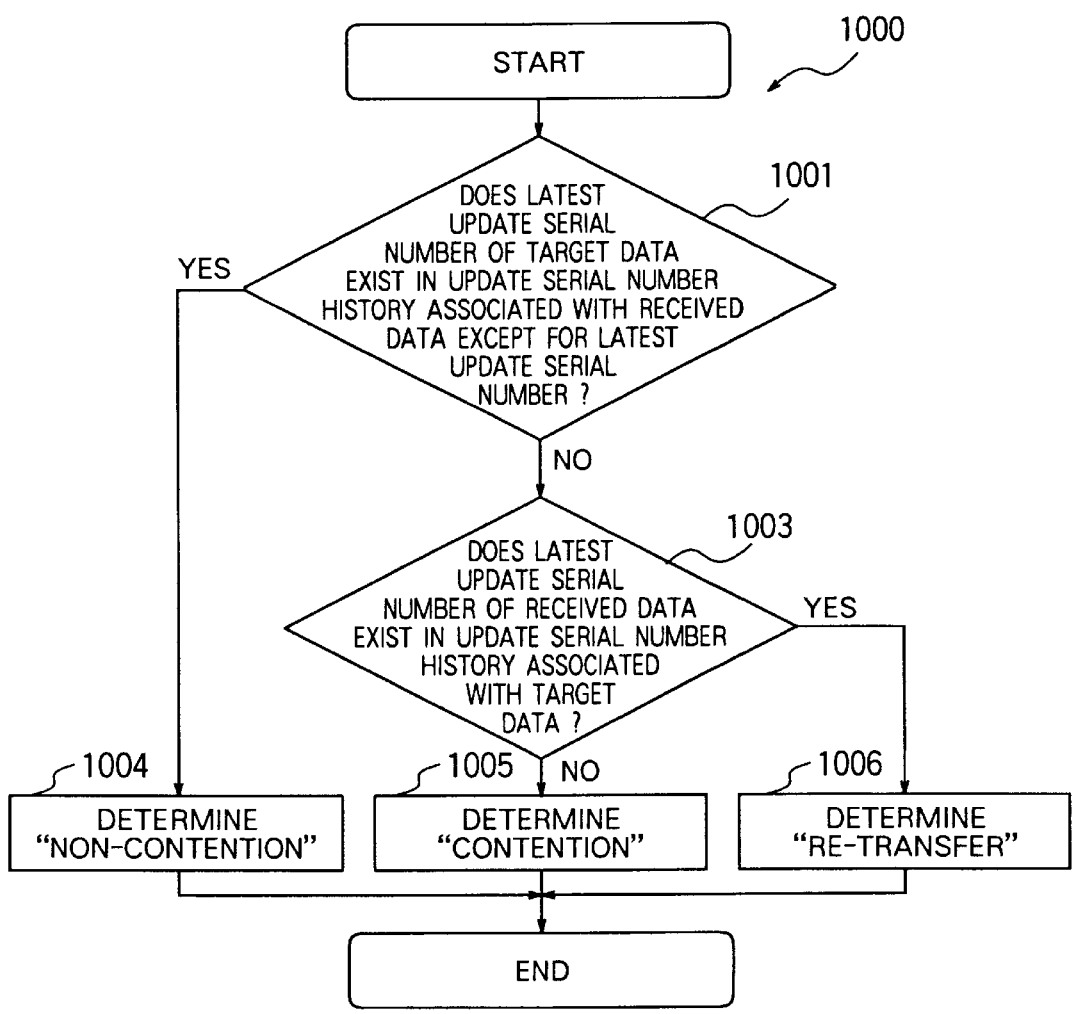
FIG. 10 is a flow chart illustrating a flow of processing executed in an update contention determination unit in the embodiment of the present invention.

FIG. 10 is a flow chart illustrating the flow of processing 1000 executed in the update contention determination unit 192. it is determined at step 1001 whether or not the latest update serial number in an update serial number history associated with target data acquired from the secondary replica data 182 exists in an update serial number history associated with received data except for the latest update serial number. If exists (YES at step 1001), the update contention determination unit 192 determines that "the received data and the target data are not contending (non-contention)" (step 1004). Otherwise (NO at step 1001), the processing proceeds to step 1003.

It is determined at step 1003 whether or not the latest update serial number in the update serial number history associated with the received data exists in the update serial number history associated with the target data. If exists (YES at step 1003), the update contention determination unit 192 determines that "the same received data has previously been received before the present transfer and the secondary replica data 182 has been updated therewith (retransfer)."

If NO is determined at step 1001 and if NO is determined at step 1003, the processing proceeds to step 1005. The processing proceeding to step 1005 means that the latest target data is not reflected to the primary replica data 112, which is the source of the received data (from the determination result at step 1001), and the latest received data is not reflected to the secondary replica data 182 (from the determination result at step 1003). From this fact, it is determined at step 1005 that "the received data and the target data are contending (contention)."

Turning back to FIG. 9, after the processing of the update contention determination unit 192 (step 905), the data receiver unit 190 updates the database 180 with the received data at step 906 if "non-contention" is determined. If "retransfer" is determined, the received data is discarded and the database 180 is not updated because the same data is being again transferred. If "contention" is determined, another processing program is executed to treat the update contention within the database system 170, however, since the treatment of the update contention is not the subject matter of the present invention, detailed explanation thereof is omitted. When the received data involves data in reference relation therewith, the processing at step 905 is repeated for the data 201 in reference relation and an associated update serial number history 207. The data in reference relationship is also subjected to the determination of update contention together with the updated data because the data in reference relationship with the updated data is highly likely to be also updated when the data is updated. When the processing sequence at steps 903–906 has been completed for one unit of received data, the processing returns to step 902. If received data still remains in the received data storing region 194, the foregoing processing is repeated for the next unit of received data. The processing sequence from step 901 to step 902 is always executed as long as data is transferred from the database system 100.

Figure 11A:
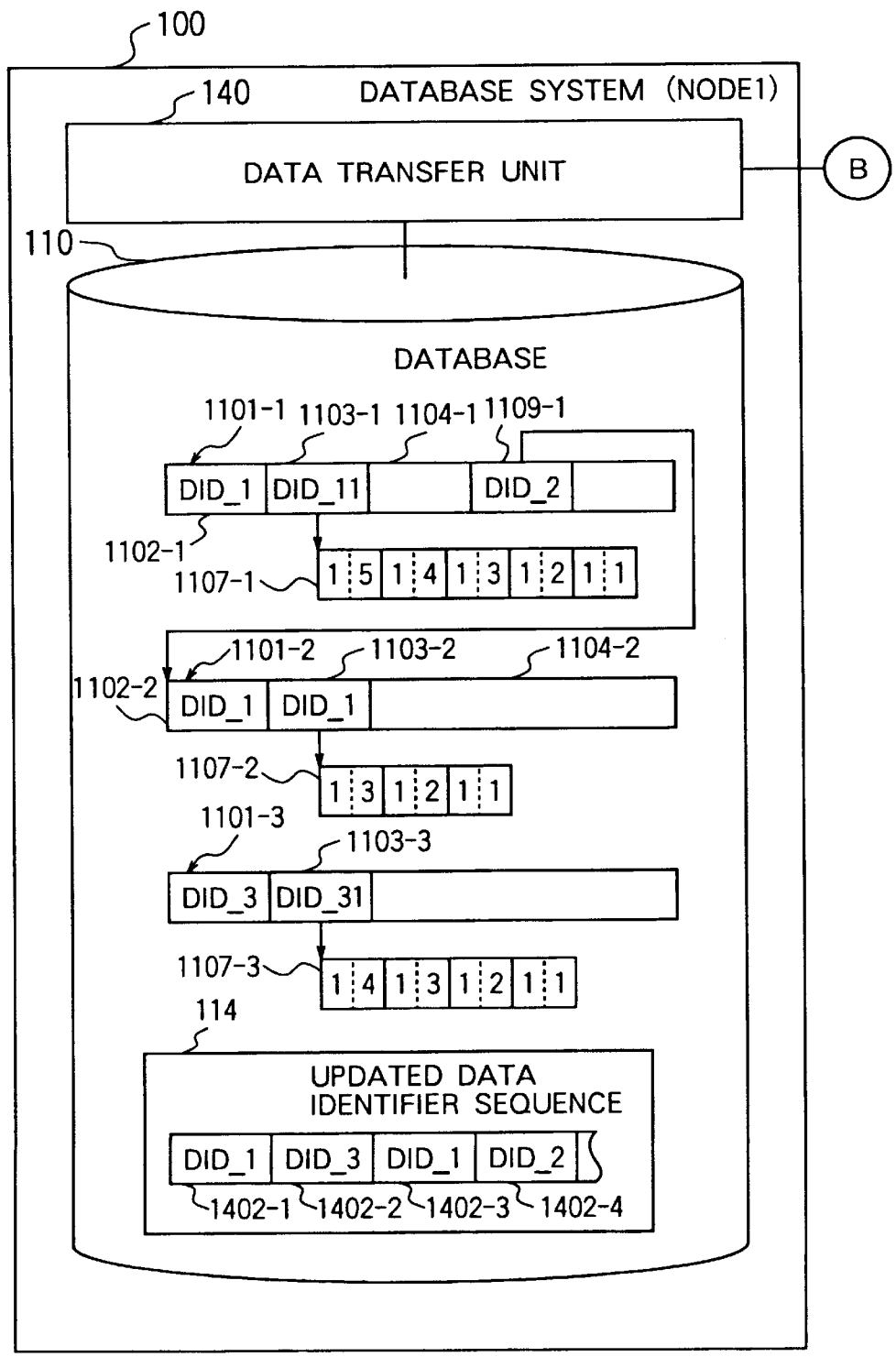

FIGS. 11A and 11B are diagrams for explaining steps of the foregoing processing in connection with a more specific example. As illustrated in FIG. 11A, when the database system 100 having a node number 1 updates the database 110, data 1101-1, 1101-2, 1101-3 are stored in the primary replica data 112 and updated data identifiers 1402-1–1402-4 of updated data are stored in the updated data identifier sequence 114, as a result of the update. The data 1101-1 has DID_1 as the contents of the data identifier 1102-1, and holds DID_11 as the contents of a history identifier 1103-1 pointing to an update serial number history 1107-1. The data 1101-1 is in reference relationship with the data 1101-2, and therefore holds the contents DID_2 of the data identifier of the data 1101-2 in 1109-1 of attribute data 1104-1. The data 1101-2 has DID_2 as the contents of the data identifier 1102-2, and holds DID_21 as the contents of a history identifier 1103-2 pointing to an update serial number history 1107-2. The data 1101-3 has DID_3 as the contents of the data identifier 1102-3, and holds DID_31 as the contents of a history identifier 1103-3 pointing to an update serial number history 1107-3.

Also, as illustrated in FIG. 11B, the database 180 possessed by the database system 170 having a node number 2 stores secondary replica data for target data 1801-1, 1801-2, 1801-3. It should be noted that, as shown by the contents of update serial number histories 1807-1–1807-3, the contents of the illustrated data and update serial number histories are not the same in the database 110 and the database 180.

In the database system 100, when the replication processing is requested, the updated data acquisition unit 142 first acquires the contents DID_1 of the updated data identifier 1402-1 from the updated data identifier sequence 114 (step 701). Next, the data 1101-1 corresponding to the contents DID_1 of the updated data identifier 1402-1 thus acquired is acquired from the database 110 (step 702), and a corresponding update serial number history 1107-1 is acquired from the database 110 based on the contents DID_11 of the history identifier 1103-1 held in the data 1101-1 (step 703). Then, the reference related data acquisition unit 114 acquires the data 1101-2 in reference relationship corresponding to the contents DID_2 of the data identifier 1109-1 of the data in reference relationship held in the data 1101-1, together with an associated update serial number history 1107-2, from the database 110 (steps 802 and 803). Next, the database transfer unit 140 transfers the data 1101-1 and the update serial number history 1107-1 associated with this data as well as the data 1101-2 in reference relationship and the associated update serial number history 1107-2 to the database system 170 (step 603).

In the database system 170, the data receiver unit 190 receives the transferred data 1101-1 and the update serial number history 1107-1 associated with this data as well as the data 1101-2 in reference relationship with the data 1101-1 and the associated update serial number history 1107-2 (step 901), and stores them in the received data storing region 194 (step 902). Then, data 1801-1 and 1801-2, which are target data corresponding to the data 1101-1 and 1101-2 as well as update serial number histories 1807-1 and 1807-2 associated with the respective data are acquired from the database 180 (step 903).

The update contention determination unit 192 determines "non-contention" at step 1001 since the latest update serial number "1-3" in the update serial number history 1807-1 associated with the target data 1801-1 exists in the update serial number history 1107-1 except for the latest update serial number 1108-1 in the update serial number history 1107-1 associated with the received data 1101-1. Similarly, for the target data 1801-2, since the latest update serial number "1-2" exists in the update serial number history 1107-2 associated with the received data 1101-2, the update contention determination unit 192 determines "non-contention" at step 1101. Then, at step 906, the target data 1801-1, 1801-2 and the update serial number histories 1807-1, 1807-2 are updated respectively with the received data 1101-1, 1101-2 and the update serial number histories 1107-1, 1107-2. In this event, the update serial number histories 1807-1, 1807-2 are entirely replaced with the update serial number histories 1107-1, 1107-2 associated with the received data, respectively.

Next, the updated data acquisition unit 142 acquires the data identifier DID_3 next to the updated data identifier DID_1 from the updated data identifier sequence 114, and executes the processing of the updated data acquisition unit 142, the reference related data acquisition unit 114, the data transfer unit 140, the data receiver unit 190, and the update contention determination unit 192, as described above. In this case, the received data 1101-3 having the updated data identifier DID_3 and the associated update serial number history 1107-2 are stored in the received data storing region 194. The update contention determination unit 192 determines that the received data 1101-3 and the target data 1801-3 are "contending" since NO is determined both at step 1001 and at step 1103.

In the foregoing processing, when updated data pointed by updated data identifiers stored in the updated data identifier sequence 114 are fully transferred at regular intervals, the same data are repeatedly transferred from the database system 100 to the database system 170 if the same data are updated a plurality of times as is the case of the data 1101-1. To eliminate this inconvenience, the data transfer unit 140 is provided therein with a region (buffer) 146 for holding data identifiers of previously transferred data such that the transfer of the same data is skipped to prevent useless repetitive transfer of data, thus making it possible to improve the data transfer efficiency.

In the foregoing embodiment, the database system 100 is located on the first computer, and the database system 170 is located on the second computer connected to the first computer through the network 160. Alternatively, the database system 100 and the database system 170 may be located on the same computer system, in which case the configuration and operations described above can be fully applied except for the data transfer through the network 160.

Further, the present invention is applicable to a distributed data system which has three or more database systems interconnected through a network.

Next, another embodiment of the present invention will be described with reference to FIGS. 12 and 13.

Figure 12:
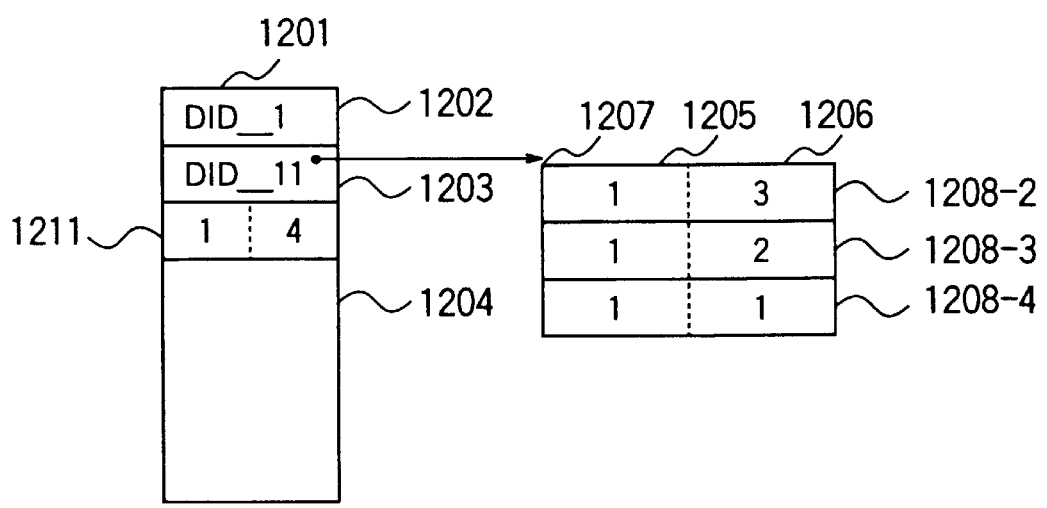
FIG. 12 is a diagram illustrating data structures of data and update serial number history in another embodiment of the present invention.

As is apparent from FIG. 12, this embodiment employs a data structure different from that illustrated in FIG. 2. Specifically, data 1201 includes a recent update serial number 122 of the data in addition to a data identifier 1202, a history identifier 1203, and attribute data 1204. Therefore, an update serial number history 1207 pointed by the history identifier 1203 stores update serial numbers 1208-2, 1208-3, 1208-4 except for the latest update serial number. When the latest serial number is stored in the data, the preceding update serial number is accumulatively stored in the update serial number history associated with the data.

Figure 13:
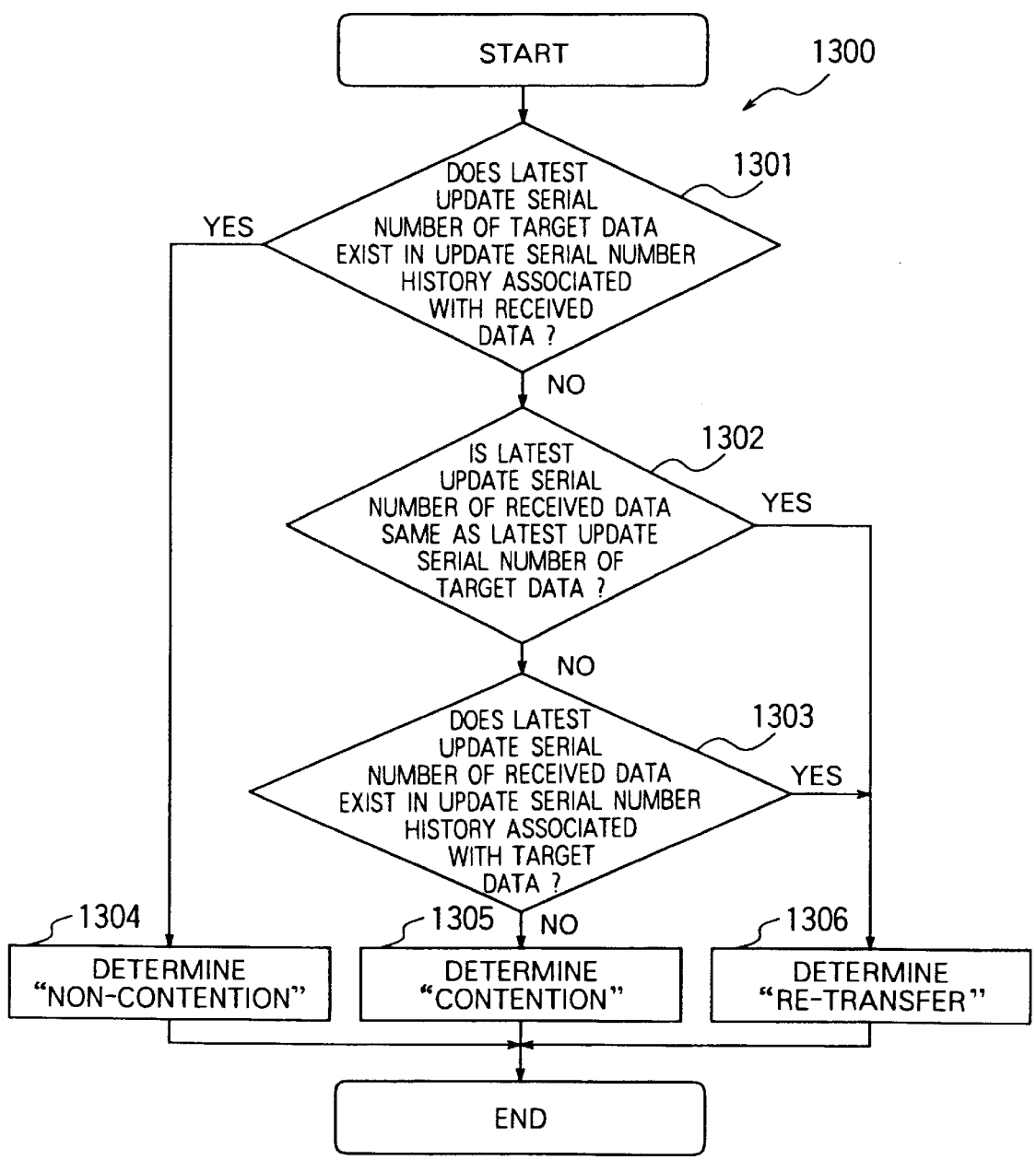
FIG. 13 is a flow chart illustrating a flow of processing executed in an update contention determination unit in another embodiment of the present invention.

FIG. 13 illustrates a flow chart of processing 1300 executed in the update contention determination unit 192 for the data having the structure as illustrated in FIG. 12.

In FIG. 13, it is determined at step 1301 whether or not the latest update serial number in an update serial number history associated with target data acquired from the secondary replica data 182 exists in an update serial number history 1207 associated with received data. If exists (YES at step 1301), the update contention determination unit 192 determines that "no contention occurs (no-contention)" since the target data has not been updated since the preceding update with received data (step 1304). If the recent update serial number does not exist in the update serial number history 1207, the processing proceeds to step 1302.

At step 1302, the latest update serial number 1211 held by the received data is compared with the latest update serial number held by the target data. If they are the same, the update contention determination unit 192 determines that the same data "is again being transferred (re-transfer)" during the replication processing (step 1306), and otherwise the processing proceeds to step 1303.

At step 1303, if the latest update serial number 1211 held by the received data exists in the update serial number history held by the target data, the update contention determination unit 192 determines that although the same data was again transferred during the replication processing, "the target data has been updated before the data is transferred again (retransfer)" (step 1306), and otherwise the update contention determination unit 192 determines that "contention occurs (contention)" (step 1305).

Specifically, if any of the conditions at steps 1301, 1302, 1303 is not satisfied, this means that the received data with the latest update serial number is not reflected to the target data and the target data with the latest update serial number is not reflected to the received data. Such a case shows that update contention is occurring with respect to the received data. The oldest update serial number 1208-4 in the update serial number history 1207 held by the received data, i.e., an update serial number 1208-1 generated when the data was produced is coincident with the oldest update serial number in the update serial number history held by target data without fail if the produced data is normally reflected to the database 180.

In the embodiment illustrated in FIGS. 12 and 13, an update serial number of target data need not be retrieved from the database 180 until the determination processing reaches step 1303 in FIG. 13.

We claim:

1. In a distributed database system including a plurality of database systems each having a database, a database possessed by one of said database systems serving as an original database, and databases of the remaining database systems being produced by replicating said original database, a method of detecting the presence or absence of an update contention of the same data in two database systems, comprising the steps of:

(a) when producing or updating data susceptible to detection of update contention, producing an update serial number for said data, said update serial number including system identifier information for identifying a database system in which said data is produced or updated and update frequency information related to the number of times of updates;

(b) accumulatively storing said update serial number in an update serial number history associated with said data each time said data is updated;

(c) transferring said updated data and the update serial number history associated therewith from a database system (hereinafter the "transmitting database system") to another database system (hereinafter the "receiving database system");

(d) comparing, in said receiving database system, the contents of said update serial number history associated with the received data with the contents of an update serial number history associated with data corresponding to said received data (hereinafter the "target data") in a database of said receiving database system; and (e) determining a contending state of said received data with said target data based on the result of the comparison at said step (d) in said receiving database system.

2. A method according to claim 1, further comprising the step of:

(f) accumulatively storing an updated data identifier pointing to said updated data each time said data is updated to form an updated data identifier sequence in said transmitting database system;

wherein at said step (c), updated data pointed by an updated data identifier selected from said updated data identifier sequence is transferred.

3. A method according to claim 1, wherein at said step (c), a check is made as to whether or not data in reference relationship with said updated data exists, when said updated data is transferred, and the data in reference relationship and an update serial number history associated therewith are transferred when the data in reference relationship exists.

4. A method according to claim 2, wherein at said step (c), a check is made as to whether or not data in reference relationship with said updated data exists, when said updated data is transferred, and the data in reference relationship and an update serial number history associated therewith are transferred when the data in reference relationship exists.

5. A method according to claim 1, wherein said step (d) comprises the substeps of:

(d1) determining whether or not the latest update serial number of said target data exists in an update serial number history except for the latest update serial number associated with said received data; and (d2) determining whether or not the latest update serial number of said received data exists in the update serial number history associated with said target data;

determining that said received data and said target data are not contending when YES is determined at said step (d1);

determining that said received data is transferred again when NO is determined at said step (d1) and YES is determined at said step (d2); and determining that said received data and said target data are contending when NO is determined at said step (d1) and NO is determined at said step (d2).

6. In a distributed database system including a plurality of database systems each having a database, a database possessed by one of said database systems serving as an original database, and databases of the remaining database systems being produced by replicating said original database, a method of detecting the presence or absence of update contention of the same data in two database systems, comprising the steps of:

(a) when producing or updating data susceptible to detection of update contention, producing an update serial number for said data, said update serial number including system identifier information for identifying a database system in which said data is produced or updated and update frequency information related to the number of times of updates;

(b) storing the latest update serial number in a predetermined field of said data and accumulatively storing the preceding update serial number in an update serial number history associated with said data each time said data is updated;

(c) transferring said updated data and the update serial number history associated therewith from a database system (hereinafter the "transmitting database system") to another database system (hereinafter the "receiving database system");

(d) comparing, in said receiving database system, the latest update serial number in said received data and the contents of said update serial number history associated with said received data respectively with the latest update serial number in data corresponding to said received data (hereinafter the "target data") and the contents of an update serial number history associated therewith; and (e) determining a contending state of said received data with said target data based on the result of the comparison at said step (d) in said receiving database system.

7. A distributed database system including a plurality of database systems each having a database, a database possessed by one of said database systems serving as an original database, and databases of the remaining database systems being produced by replicating said original database, updated data being transferred from a database system (hereinafter the "transmitting database") to another database system (hereinafter the "receiving database"), wherein:

each of said database systems includes an update information creating unit operable when data susceptible of detection of update contention is produced or updated for producing an update serial number for said data, and for accumulatively storing said update serial number in an update serial number history associated with said data each time said data is updated, said update serial number including system identifier information for identifying a database system in which said data is produced or updated and update frequency information related to the number of times of updates;

said transmitting database system includes:

an updated data acquisition unit for acquiring updated data and an update serial number history associated therewith from its own database in response to a request for transferring said updated data; and a data transfer unit for transferring said acquired updated data and update serial number history associated therewith to said receiving database system; and said receiving database system includes:

a received data storing region for storing received data and an update serial number history associated therewith; and an update contention determination unit for comparing the contents of said update serial number history associated with said received data stored in said storing region with the contents of an update serial number history associated with data corresponding to said received data (hereinafter the "target data") in its own database to determine a contending state of said received data with said target data based on the comparison result.

8. A distributed database system according to claim 7, wherein said transmitting database system includes an updated data identifier sequence for accumulatively storing an updated data identifier pointing to said updated data each time said data is updated; and said data transfer unit selects an updated data identifier from said updated data identifier sequence to transfer updated data pointed by said selected updated data identifier.

9. A distributed database system according to claim 7, wherein said transmitting database system includes a reference related data acquisition unit for checking whether or not data in reference relationship with said updated data exists, and for acquiring the data in reference relationship and an update serial number history associated therewith when the data in reference relationship exists; and said data transfer unit, when transferring said updated data and the update serial number history associated therewith, also transfers said data in reference relationship with said updated data and the update serial number history associated therewith.

10. A distributed database system according to claim 8, wherein said transmitting database system includes a reference related data acquisition unit for checking whether or not data in reference relationship with said updated data exists, and for acquiring the data in reference relationship and an update serial number history associated therewith when the data in reference relationship exists; and said data transfer unit, when transferring said updated data and the update serial number history associated therewith, also transfers said data in reference relationship with said updated data and the update serial number history associated therewith.

11. A distributed database system according to claim 7, wherein said update contention determination unit:

(d1) determines whether or not the latest update serial number of said target data exists in an update serial number history except for the latest update serial number associated with said received data; and (d2) determines whether or not the latest update serial number of said received data exists in the update serial number history associated with said target data;

determines that said received data and said target data are not contending when YES is determined at said step (d1);

determining that said received data is transferred again when NO is determined at said step (d1) and YES is determined at said step (d2); and determines that said received data and said target data are contending when NO is determined at said step (d1) and NO is determined at said step (d2).

12. A distributed database system including a plurality of database systems each having a database, a database possessed by one of said database systems serving as an original database, and databases of the remaining database systems being produced by replicating said original database, updated data being transferred from a database system (hereinafter the "transmitting database") to another database system (hereinafter the "receiving database"), wherein:

each of said database systems includes an update information creating unit operable when data susceptible to detection of update contention is produced or updated for producing the latest update serial number for said data, storing said latest update serial number in a predetermined field of said data, and accumulatively storing the preceding update serial number in an update serial number history associated with said data, said update serial number including system identifier information for identifying a database system in which said data is produced or updated and update frequency information related to the number of times of updates;

said transmitting database system includes:

an updated data acquisition unit for acquiring updated data and an update serial number history associated therewith from its own database in response to a request for transferring said updated data; and a data transfer unit for transferring said acquired updated data and update serial number history associated therewith to said receiving database system; and said receiving database system includes:

a received data storing region for storing received data and an update serial number history associated therewith; and an update contention determination unit for comparing the contents of said update serial number history associated with said received data stored in said storing region with the contents of an update serial number history associated with data corresponding to said received data (hereinafter the "target data") in its own database to determine a contending state of said received data with said target data based on the comparison result.

13. A distributed database system according to claim 12, wherein said transmitting database system and said receiving database system are located on computer systems independent of each other, said transmitting database system and said receiving database system being connected through a network.

14. A distributed database system according to claim 7, wherein said transmitting database system and said receiving database system are located on a single computer.

15. A distributed database system according to claim 8, wherein said data transfer unit includes a buffer for storing the contents of said updated data identifier sequence, and said data transfer unit avoids repetitively transferring updated data a plurality of times based on the contents of said buffer.

16. In a distributed database system having a first database system possessing a first database and a second database system possessing a second database to which an update of data within said first database is reflected with a replica of the data such that said second database has the same contents as said first database, a method of detecting an update contention involved in replication of database, said update contention occurring when data having the same date identifier in the first and second databases are independently updated in both of said first database system and said second database system, said method comprising the steps of:

constructing each of said databases such that data is associated with an update serial number history which accumulatively stores an update serial number including an identifier corresponding to said first or second database system and the number of times of update performed on said data;

adding said update serial number to said update serial number history associated with said data each time said data is updated by said first and second database systems;

transferring said updated data and said update serial number history to said second database system when said updated data is reflected from said first database system to said second database system;

comparing an update serial number in the update serial number history associated with said data received by said second database system with an update serial number in an update serial number history associated with data to be updated in said second database; and determining an update contention if the latest update serial number of the data to be updated is not coincident with any of update serial numbers of said received data except for the latest update serial number thereof and if the latest update serial number of said received data is not coincident with any of update serial numbers of the data to be updated except for the latest update serial number thereof.

17. A method of detecting an update contention according to claim 16, further comprising the steps of:

storing a data identifier of updated data in a storage unit each time the data in said first database is updated by said first database system;

sequentially retrieving said data identifiers from said storage unit when the updated data in said first database is transferred to said second database system; and transferring said data corresponding to the retrieved data identifier and said update serial number history to said second database system.

18. A method of detecting an update contention according to claim 16, wherein data in reference relationship with said data and an update serial number history associated therewith are also transferred to said second database system, when said updated data and the update serial number history associated therewith are transferred to said second database system, and said data in reference relationship with said updated data is also subjected to the detection of update contention.

* * * * *